(12) United States Patent
Zak et al.

(10) Patent No.: US 12,220,808 B2
(45) Date of Patent: Feb. 11, 2025

(54) METHOD AND SETUP FOR FENCELESS ROBOTICS

(71) Applicants: MAGNA INERNATIONAL INC., Ontario (CA); Alexander Zak, Troy, MI (US); Johannes Hartlieb, Semriach (AT)

(72) Inventors: Alexander Zak, Troy, MI (US); Johannes Hartlieb, Semriach (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 284 days.

(21) Appl. No.: 17/782,317

(22) PCT Filed: Dec. 4, 2020

(86) PCT No.: PCT/US2020/063234
§ 371 (c)(1),
(2) Date: Jun. 3, 2022

(87) PCT Pub. No.: WO2021/113589
PCT Pub. Date: Jun. 10, 2021

(65) Prior Publication Data
US 2023/0001587 A1  Jan. 5, 2023

Related U.S. Application Data

(60) Provisional application No. 62/944,029, filed on Dec. 5, 2019.

(51) Int. Cl.
*B25J 13/08* (2006.01)
*B25J 9/16* (2006.01)

(52) U.S. Cl.
CPC ........... *B25J 13/084* (2013.01); *B25J 9/1676* (2013.01); *B25J 9/1697* (2013.01); *B25J 13/086* (2013.01)

(58) Field of Classification Search
CPC ...... B25J 13/084; B25J 9/1676; B25J 9/1697; B25J 13/086; B25J 19/023; B25J 19/06; G05B 19/042; F16P 3/142
See application file for complete search history.

(56) References Cited

U.S. PATENT DOCUMENTS 4,541,770 A * 9/1985 Niinomi ................... B25J 9/009
414/730
7,298,385 B2 * 11/2007 Kazi ...................... B25J 9/1671
700/254
(Continued)

FOREIGN PATENT DOCUMENTS

EP    3017920 B1    8/2017
JP    H09285992 A   11/1997
(Continued)

OTHER PUBLICATIONS

Extended European Search Report regarding corresponding EP App. No. 20895555.9; dated Feb. 20, 2024.

*Primary Examiner* — Jason Holloway
*Assistant Examiner* — Madison B Emmett
(74) *Attorney, Agent, or Firm* — Dickinson Wright PLLC

(57) ABSTRACT

A fenceless system and method for automatically moving one or more items between a structure at a source location and a destination using a robot is provided. The system comprises a robot having an end effector to selectively grasp an item. A trajectory planning controller directs the robot to move the item between a source location and a destination. A touch sensor detects a contact between an external object and a surface of the robot or a surface surrounding the end effector; and a proximity sensor detects a person in proximity to the robot. A vision sensor detects a location and orientation of items to be moved. The robot moves in proximity to a person without a safety fence preventing the person from contacting the robot. The system adjusts a speed (Continued)

of the robot in response to detecting a person in one of a plurality of zones around the robot.

18 Claims, 14 Drawing Sheets

(56) References Cited

U.S. PATENT DOCUMENTS

| | | | |
|---|---|---|---|
| 7,783,386 B2 | 8/2010 | Merte et al. | |
| 9,043,025 B2 | 5/2015 | Brooks et al. | |
| 2008/0021597 A1* | 1/2008 | Merte | F16P 3/144 |
| | | | 700/255 |
| 2011/0218673 A1* | 9/2011 | Oga | G05B 19/416 |
| | | | 700/254 |
| 2013/0345869 A1* | 12/2013 | Chen | B25J 11/0005 |
| | | | 901/46 |
| 2014/0067121 A1* | 3/2014 | Brooks | B25J 9/1676 |
| | | | 700/255 |
| 2014/0121836 A1* | 5/2014 | Ban | B25J 9/0093 |
| | | | 700/259 |
| 2015/0273689 A1* | 10/2015 | Ouchi | B25J 9/1697 |
| | | | 901/31 |
| 2017/0057095 A1* | 3/2017 | Oestergaard | B25J 13/088 |
| 2017/0095925 A1 | 4/2017 | Yamane et al. | |
| 2017/0136633 A1 | 5/2017 | Zillich | |
| 2017/0341239 A1* | 11/2017 | Nakayama | B25J 13/085 |
| 2018/0043549 A1 | 2/2018 | Su et al. | |
| 2018/0099410 A1* | 4/2018 | Hannya | B25J 9/1674 |
| 2019/0047160 A1* | 2/2019 | Weitschat | B25J 19/0075 |
| 2019/0061158 A1 | 2/2019 | Vu et al. | |
| 2019/0118381 A1 | 4/2019 | Kikkeri et al. | |
| 2019/0262993 A1* | 8/2019 | Cole | B25J 9/1676 |
| 2019/0291272 A1* | 9/2019 | Doan | B25J 9/1664 |
| 2019/0389069 A1* | 12/2019 | Kalbavi | G06F 3/0346 |
| 2021/0170601 A1* | 6/2021 | Saito | B65G 1/0435 |

FOREIGN PATENT DOCUMENTS

| | | |
|---|---|---|
| WO | 2018148181 A1 | 8/2018 |
| WO | 2019025255 A1 | 2/2019 |
| WO | 2019060529 A1 | 3/2019 |

* cited by examiner

METHOD AND SETUP FOR FENCELESS ROBOTICS

CROSS-REFERENCE TO RELATED APPLICATIONS

This U.S. National Stage Patent Application claims the benefit of PCT International Patent Application Serial No. PCT/US2020/063234 filed Dec. 4, 2020 entitled "METHOD AND SETUP FOR FENCELESS ROBOTICS" which claims the benefit of U.S. Provisional Patent Application Ser. No. 62/944,029 filed on Dec. 5, 2019, and titled "Method And Setup For Fenceless Robotics", the entire disclosures of which are hereby incorporated by reference.

BACKGROUND

Assembly processes (or lines) are implemented to produce a finished good. The finished goods are a combination of various parts that are attached together through various techniques. A finished good may be any sort of object or product, for example, those sold in commerce. An automobile or vehicle, or a part of an automobile or vehicle, may be a finished good produced via an assembly process. Many aspects of a manufacturing process involve moving items, such as individual parts, assemblies, or carriers holding one or more individual parts or assemblies for transport or for processing together.

Many finished goods include parts from a variety of sources, which are transported to and within manufacturing locations to be combined into finished goods or into assemblies or sub-assemblies thereof. These parts are frequently transported in bins, where they may be loose, having random locations and orientations. Parts must be transferred from the bins to a destination to facilitate the use of the part in the manufacturing process. Parts are also frequently processed in batches using specialized carriers such as baskets, bins, or paint bucks, which must be loaded and unloaded with individual parts or assemblies. Also, in some cases, movement of the carriers requires special handling due to the requirements of the manufacturing process and/or other considerations such as weight and/or size of the loaded or unloaded carriers.

For many portions of a manufacturing process, the current technique of moving items is a manual process. Special considerations are required in moving large and/or heavy items. For example, stamped metal parts are commonly picked by a human from a bin and placed into a fixture for further processing (e.g., cutting, welding, adhesion, or painting). After processing, the human may pick the parts from a fixture and place them into a bin, which may be a new bin or the same bin from which the parts originated. During the pick/place operations, the human may also perform quality checks on the part.

Robots have been used to automate pick and place operations, especially in places where the items are too heavy for a person to easily lift or where the item or the area presents hazards, such as high temperatures or high noises. Conventionally, fences, such as electronic fences have been used to delineate a robot cell where robots can operate without risk of hitting a person or another object. However, fenced robot cells create a number of costs including costs in maintaining safety and monitoring equipment and costs in production floor space.

Some human-safe robot technologies have been developed to allow robots to move in the presence of humans and without needing a fenced robot cell. Such human-safe technologies may include, for example, touch sensors that stop the robot in response to contact with an external object, such as a person. Conventional human-safe robots generally require relatively low speed operation (e.g., about 150-200 mm/s) and relatively low payload capacities (e.g., about 30 Kg or less). These restrictions on speeds and payload capacities limit the kinetic energies produced by the movement of payloads in order to minimize risks and types of injuries to a human in the event of inadvertent contact.

However, those restrictions on speed and payload capacities make conventional human-safe robot technologies unsuitable for many robotic applications that require higher payloads and/or higher speeds in order to meet production requirements.

SUMMARY

A fenceless conveyance system and method for automatically moving one or more items between a source location and a destination using a robot is provided.

The fenceless conveyance system comprises a robot having an end effector configured to selectively grasp an item. The system also comprises a trajectory planning controller configured to direct the robot to move the item between a source location and a destination. The system also comprises a touch sensor configured to detect a contact between an external object and a surface of the robot or a surface surrounding the end effector; and a proximity sensor configured to detect a person in proximity to the robot. The robot is configured to move in proximity to a person without a safety fence preventing the person from contacting the robot.

The method for moving an item comprises picking an item from a source location by an end effector on a robot; moving the item along a path to a destination by the robot; placing the item at the destination by the end effector on the robot; and stopping the robot from moving in response to detecting contact between an external object and a surface of the robot or a surface surrounding the end effector. The robot is configured to move in proximity to a person without a safety fence preventing the person from contacting the robot.

DESCRIPTION OF THE DRAWINGS

The detailed description refers to the following drawings, in which like numerals refer to like items, and in which.

DETAILED DESCRIPTION OF THE EXAMPLE EMBODIMENTS

Figure 1:
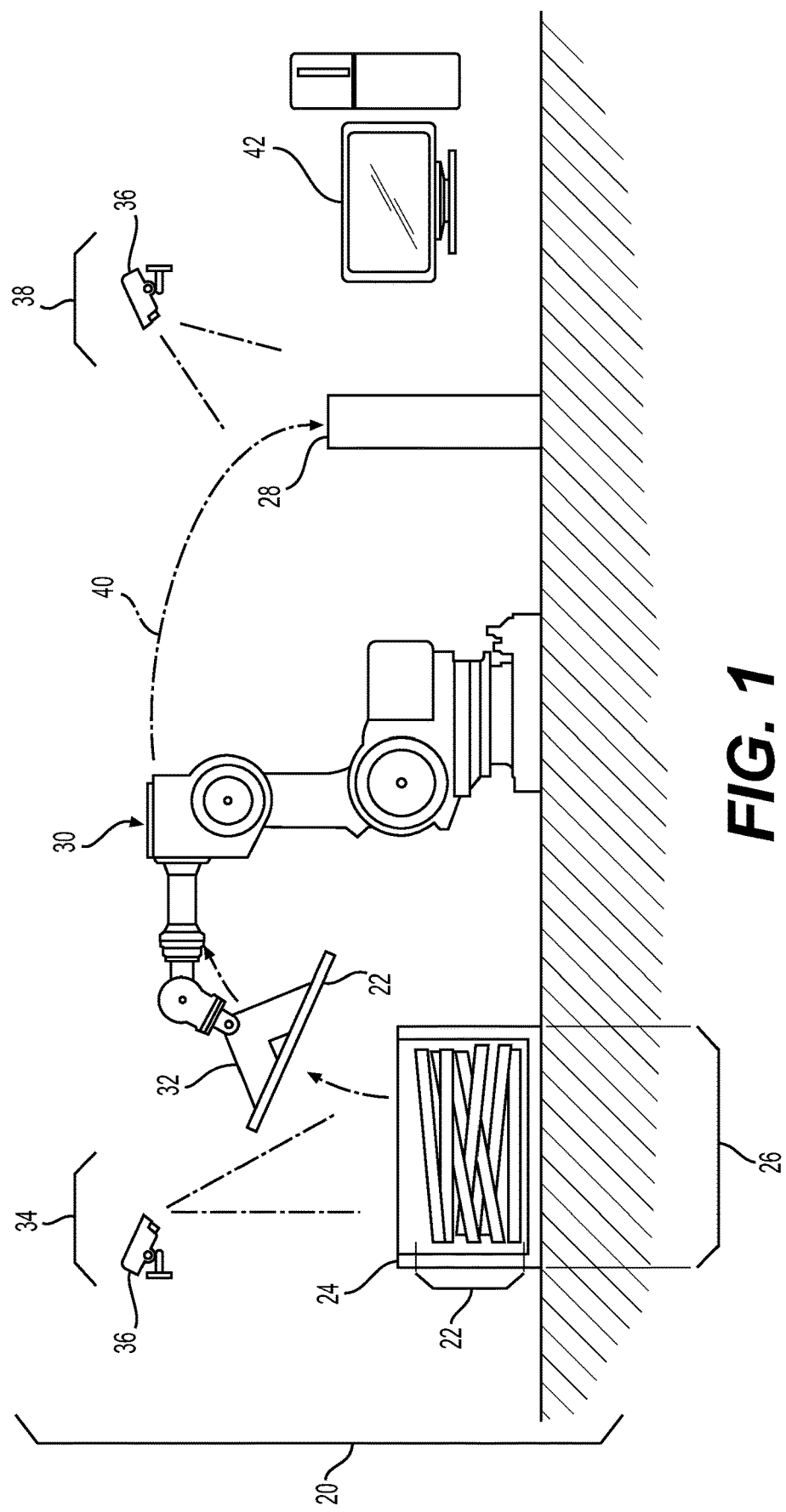
FIG. 1 is a schematic diagram of a system for automatically moving one or more parts between a bin at a source location and a destination.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g., XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Referring to the Figures, wherein like numerals indicate corresponding parts throughout the several views, a conveyance system 20 and method for automatically moving one or more items 21 between a structure at a source location 26 and a destination 28 using a robot 30 with an end effector 32 are disclosed.

One example of the conveyance system 20 of the present disclosure is shown in FIG. 1 for automatically moving one or more parts 22 between a bin 24 at a source location 26 and a destination 28 using a robot 30 with an end effector 32, and where the parts 22 may be loose or not fixed in specific locations in the bin 24. As used in this disclosure, a bin 24 may include any box, rack, tray, or other carrier for holding parts 22. It should be appreciated that the term "part" 22 as discussed throughout the subject disclosure, including the claims, may encompass various types of objects including, but not limited to, raw materials, housings, and component pieces in any stage of manufacture, assemblies or sub-assemblies in any stage of construction, and finished pieces or assemblies. A variety of different items 21 may be accommodated and moved by the same conveyance system 20, using the same or different end effectors 32. It should also be appreciated that the term "item" 21 may refer to a part 22, a bin 24, or any other physical item including, but not limited to a tool, part, fixture, raw material, housing, component piece in any stage of manufacture, assembly or sub-assembly in any stage of construction, finished pieces or assemblies, a box, rack, tray, or other carrier.

As best shown in FIG. 1, a first vision system 34 may identify a part 22 within the bin 24 at a source location 26 and determine a pick location, and a pick orientation of the part 22. A second vision system 38 may determine the location and orientation of a destination 28, which may be inside or outside of the bin 24. The destination 28 may be any place where one or more parts are to be moved, including, for example: fixtures or carriers for manufacturing or inspection, shipment, etc.; racks or packages for storage or conveyance; conveyors; fixtures or assemblies in any stage of manufacture. The destination 28 may be fixed in position and orientation. The destination 28 may be variable in position and/or orientation, such as for parts being placed on an assembly as it moves along an assembly line. Additionally, the destination 28 for each of a series of parts 22 may be different, for example in cases where a rack, or other such assembly is loaded with a plurality of parts 22, with each part 22 in a separate compartment or location on the rack.

Each of the vision systems 34, 38 may be any type of machine vision system, including one or more cameras 36 or other imaging devices and including but not limited to 2D, 2.5D, and 3D systems capable of identifying and locating a part 22 in 3-dimensional space, having x, y, and z coordinates, as well as a 3-dimensional orientation of roll, pitch, and yaw. One example of such a machine vision system is the camera system manufactured by Cognex. Such identifying and locating may be done using direct observations and measurements, through comparisons with one or more reference images, through any other method or combination of methods.

The conveyance system 20 includes a robot 30 having an end effector 32 to pick the part 22 from the bin 24, move the part 22 along a path 40, and place the part 22 at the destination 28. The end effector 32 may be an advanced effector (e.g., tooling), or any other effector capable of moving an item 21 including, but not limited to, a grasp, clamp, and a suction device. The system also includes a trajectory planning controller 42 for planning a best path 40 for the robot 30 to follow in moving the item 21 between the source location 26 and the destination 28.

Figure 2:
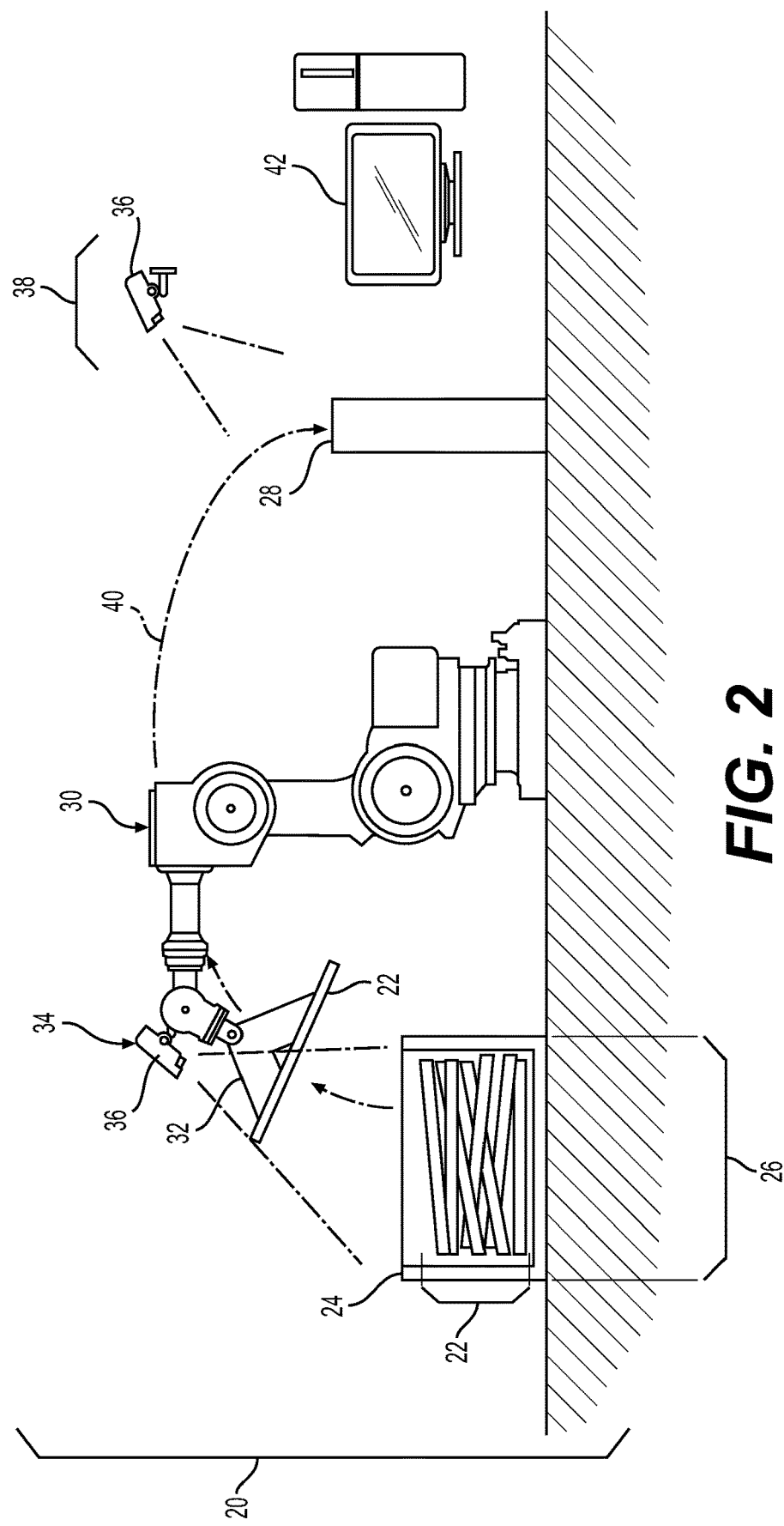
FIG. 2 is another schematic diagram of a system for automatically moving one or more parts between a bin at a source location and a destination.

Each of the vision systems 34, 38 may include one or more cameras 36 located at fixed positions, as shown on FIG. 1. Alternatively or additionally, the first vision system 34 may include a camera 36 that is located on the robot 30, as shown on FIG. 2. More specifically, the camera 36 may be located on or near a free or distal end of the robot 30. The camera 36 may be located on the end effector 32 of the robot 30 or on another part of the robot 30, such as a joint or a structural component near the end effector 32. Such a robot-mounted camera 36 may be used instead of or in addition to one or more cameras 36 at fixed positions. Alternatively or additionally, the second vision system 38 may include a camera 36 that is located on the robot 30. In one embodiment, the vision systems 34, 38 may share one or more cameras 36 that are mounted on the robot 30. In other words, the vision systems 34, 38 may each be configured to use a shared camera mounted on the robot. Such a configuration may include one of the vision systems 34, 38 passing an image signal from the shared camera to the other one the vision systems 34, 38. Alternatively, an image from the shared camera may be provided to each of the vision systems 34, 38 from the shared camera or from another device, such as a signal splitter.

Figure 3:
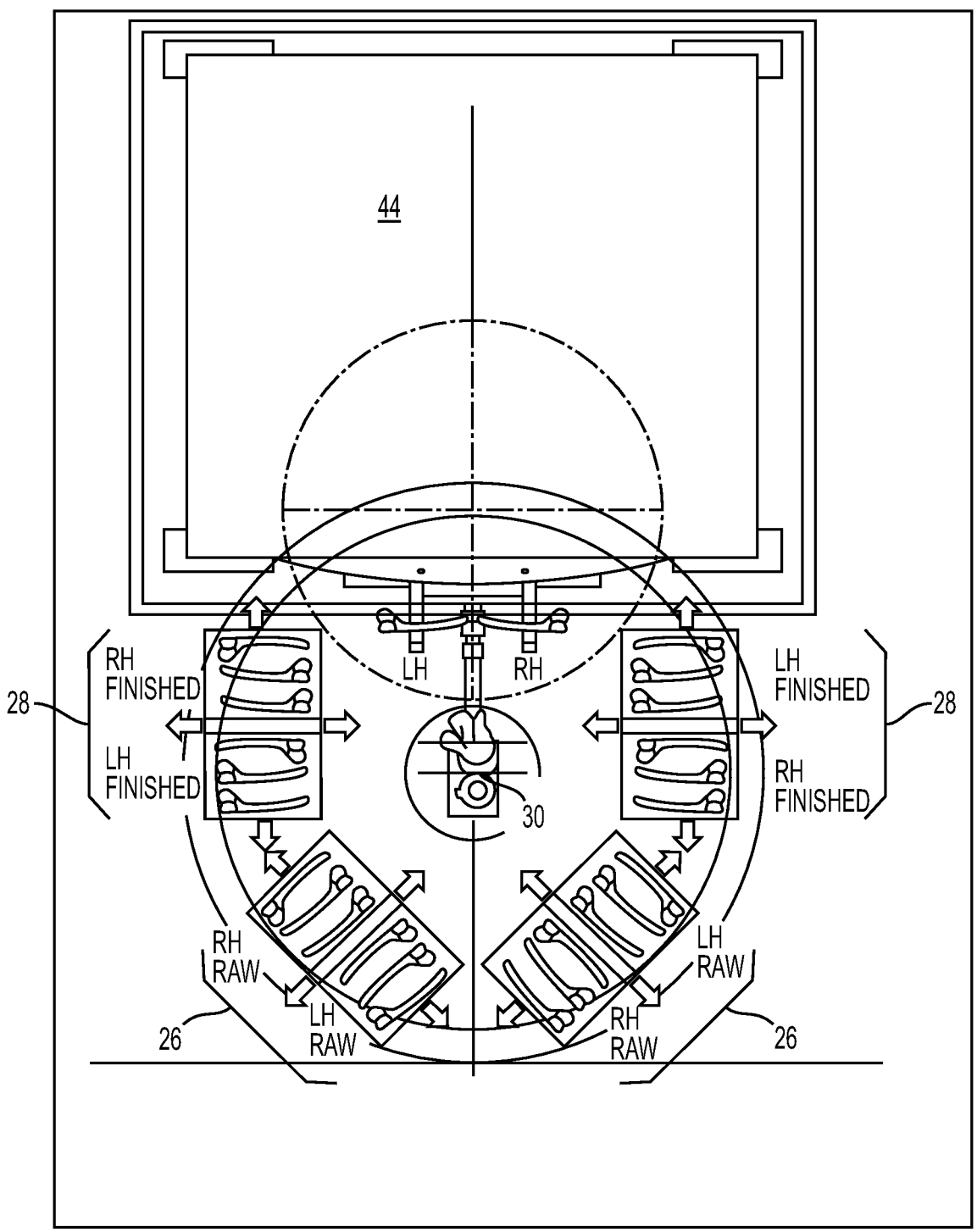
FIG. 3 is a top view of a machine and bins around a robot for automated loading and unloading of the machine, with each bin being located within a window and without a locating fixture.

As shown in FIG. 3, an example application of the conveyance system 20 of the present invention may be to replace a manual operation of loading and unloading vehicle fascias onto paint bucks, or racks used in paint processes. For example, the process of loading the paint bucks may require a crew, with persons alternating between picking from the walk-in bin (at floor level) and placing the parts in a buck (at hip level) and by transferring the part to each other in order to relieve the ergonomic stressors. As shown in FIG. 3, the conveyance system 20 of the present invention may replace the manual loading and unloading of vehicle fascias to and from paint bucks and may allow the combined operation to be performed with fewer persons per shift. The bins 24 may be located within a general window area, which may be a predetermined tolerance value from a predetermined nominal position or boundary. The bins 24 may not need to be secured or placed in an exact location, and therefore may not require locating fixtures. The parts 22 may be fixed within the bins 24, such as by fixtures formed in the bins 24, and the number of parts within a bin 24 may vary. The conveyance system 20 of the present disclosure may accommodate several different types of parts, such as for different vehicle models. For example, a conveyance system 20 may accommodate 17 or more different types of parts. According to an aspect, the conveyance system 20 may require both the source and the destination to be stationary. Alternatively, the conveyance system 20 may allow the loading and unloading of bucks which are moving in up to two different directions simultaneously, such as may result from being moved along a curved segment of conveyor track. The conveyance system 20 of the present disclosure may provide for faster and/or more consistent cycle times in loading or unloading parts 22 when compared to the manual loading and unloading operations of the prior art and may allow for a direct labor reduction from 5 persons per shift to 1 person per shift.

As shown in FIG. 3, the conveyance system 20 may be used to control a robot 30 to move one or more parts 22 into and out of a machine 44. The robot 30 may pick one or more parts 22 from a source location 26, which may be, for example, a first bin 24 holding raw, or unfinished parts 22, and carry the parts 22 to the machine 44 for processing, after which the robot 30 may remove pick the finished parts 22 to a destination 28, which may be, for example, a second bin 24 for transporting the finished parts 22 to another area. In the example shown in FIG. 3, the robot 30 may load and unload right-hand (RH) and left-hand (LH) parts 22 for simultaneous processing by the machine 44. The conveyance system 20 may accommodate some variation in the placement of the bins 24 used for the source location 26 and the destination 28. Such variation may allow the source and destination bins 26, 28 to be located anywhere within a window of space in each direction from a nominal position. Therefore, the bins 24 do not need to be secured in a precise location and may not require a locating fixture. The robot 30 may accommodate for variations in the location and tolerances of the parts 22. According to an aspect, the conveyance system 20 may inspect the finished parts 22, to ensure that the finished parts 22 were properly processed by the machine 44 before the parts 22 are allowed to be processed further. Such an inspection may be, for example, a hole inspection to verify that holes are properly made in the parts 22. According to a further aspect, conveyance system 20 may accommodate a variation in the number of parts 22 or bins 24 located at the source location 26 and/or the destination 28, such as variations in the stack height, and may automatically pick or place parts 22 from the top of a stack of bins 24. Such a system 20 may replace a current manual loading and unloading operation and may occupy the same or a smaller square footage footprint on a building floor. The example shown in FIG. 3 may allow a reduction from 1 to 0 direct labor on each shift to perform the loading and unloading of parts 22 from the machine 44.

Figure 4:
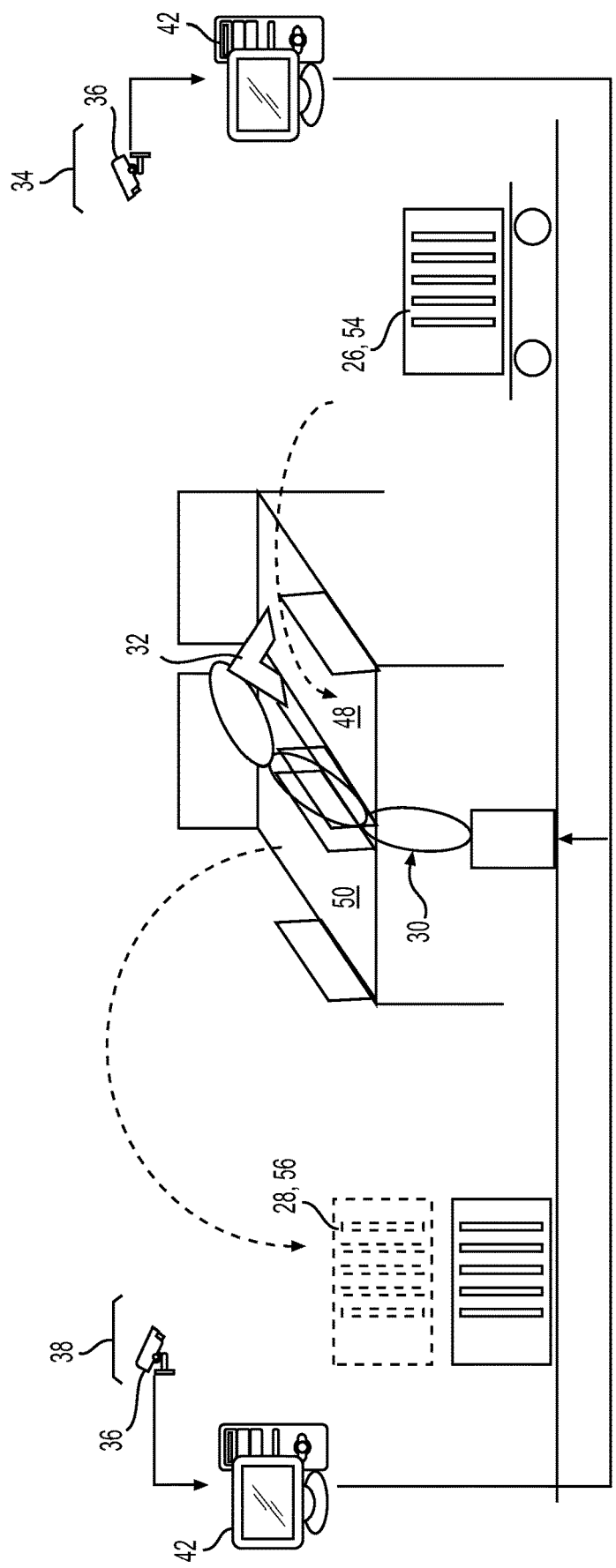
FIG. 4 is a schematic diagram of an automated process for loading and unloading of baskets of parts to and from a machine according to some embodiments of the present disclosure.

As shown in FIG. 4, an example application of the conveyance system 20 of the present invention may be to replace a manual operation of loading and unloading baskets 46 of parts 22 into and out of a machine 44. In the example shown, the machine 44 is a washer with an input belt 48 for receiving baskets 46 of dirty parts 22 and an output belt 50 for removal of baskets 46 cleaned parts 22. Parts 22 to be washed arrive in a basket 46 and are placed in a defined position on a rack inside the basket 46. The operator may load a basket 46 from a source location 26 onto the input belt 48 and may then unload the basket 46 from the output belt 50 by moving the basket 46 to a destination 28. The baskets 46, with parts 22 may require the use of a mechanical aid such as a crane 52 to lift in order to be compliant with health and safety regulations. The use of a crane 52 may be difficult and/or cumbersome to use and may not be embraced by staff. The operator loading and unloading the machine 44 may perform quality, quantity, and data logging tasks on the parts 22.

The process of manually loading and unloading a washing machine 44 may involve the following steps:

Step 1: The operator takes the basket 46 off a standing/fixed delivery carriage 54 and places the basket 46 on the input belt 48 on the right side of the washing machine 44.

Step 2: The operator takes the basket 46 off the output belt 50 on the left side of the washing machine 44 and places the basket 46 on a stationary carriage 56 in a defined area with. Stack height may vary depending on how many baskets 46 are already in place on the carriage 56.

As illustrated in FIG. 4, the carriage 56 may be fixed, being stationary and located in a general predetermined location window, shown as a taped rectangle on the floor, but the carriages 56 do not need to be located or secured in a precise position such as by using a mechanical carriage fixing device. The loading and unloading operations are not time-critical. The cycle time of the machine may allow for some variation in when the baskets 46 are loaded and unloaded. The loading and loading operations may require careful handling. The baskets 46 may vary in weight and height to accommodate different numbers and types of parts 22. Due to the physical constraints of the machine 44 and the carriages 54, 56, fencing for a traditional robot cell around the machine 44 may not be feasible.

As shown in FIG. 4, the conveyance system 20 including a robot 30 may be used to load and unload baskets 46 of parts 22 from the washing machine 44. The system 20 may locate a basket 46 from the standing/fixed delivery carriage 54 and may pick the basket 46 with an end effector 32 on the robot 30, which may place the basket 46 on the input belt 48 (dirty parts) of the washing machine 44. The system 20 may detect and locate a basket 46 on the output belt 50 of the washing machine 44 and may move the basket 46 onto stack on a carriage 56. The conveyance system 20 may use cameras 36 accommodate baskets 46 that vary in size and weight and which are not fixed in a specific location. The conveyance system 20 may perform quantity, quality inspection, and data logging tasks. The conveyance system 20 may allow baskets to be stacked at different positions on a carriage 56 which may vary according to the existing load on that carriage 56. The system 20 may provide for loading and unloading cycle times of less than 80s to prevent any bottleneck at the loading or unloading steps. The robot 30 may have TUV certified skin technology and may recognize and/or inform humans in the working area. In this way, the robot 30 may be able to operate without protective fencing.

Figure 5:
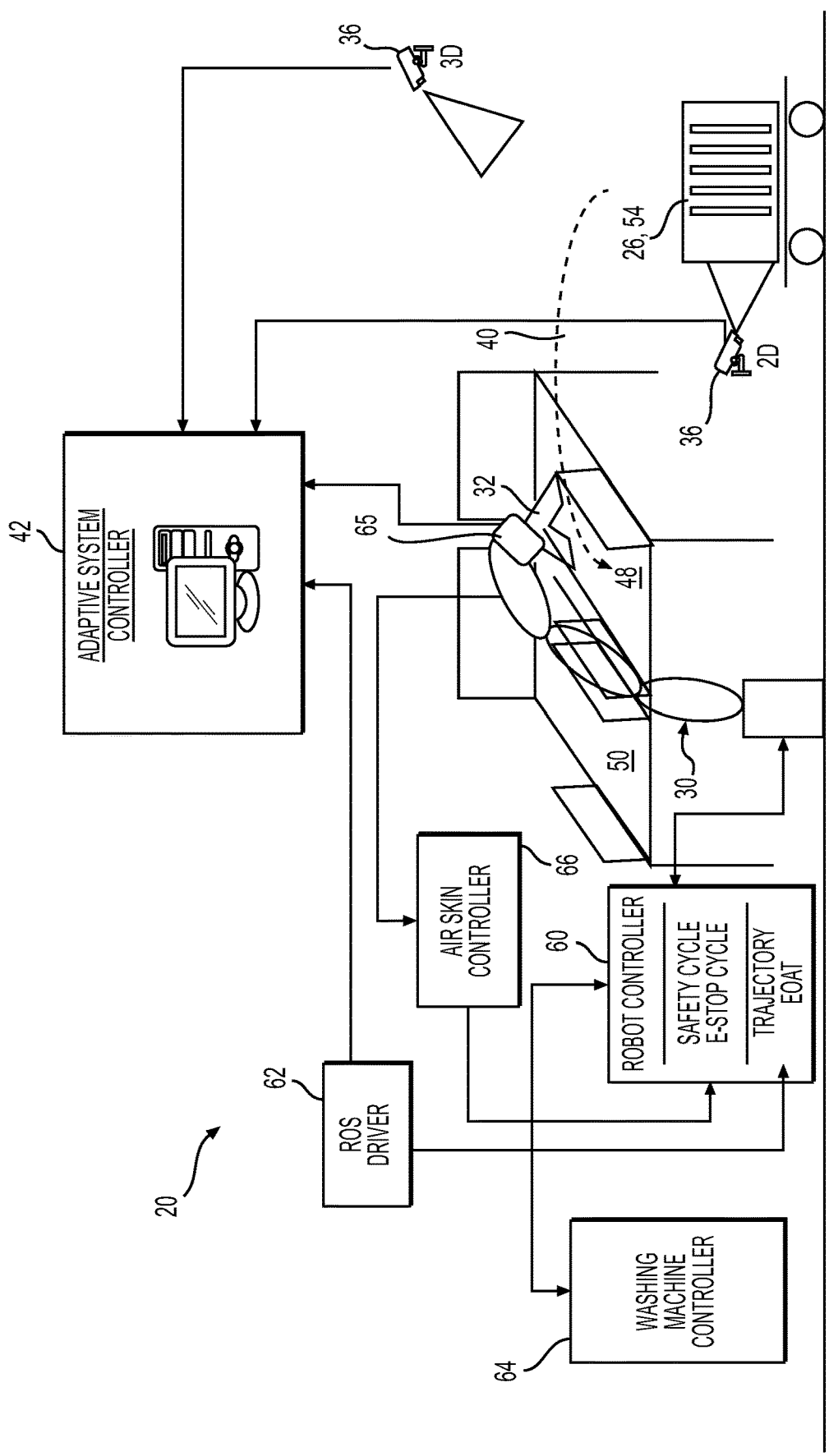
FIG. 5 is another schematic diagram of the automated process for loading and unloading of baskets of parts according to some embodiments of the present disclosure.

FIGS. 4 and 5 provide schematic views of the conveyance system 20 of the present disclosure as used for the example application of loading and unloading baskets 46 of parts 22 from a washing machine 44.

As shown in FIG. 4, a first vision system 34 including at least one camera 36 may identify a basket 46 including its precise pick location and pick orientation in the source location 26, which may be delivery carriage 54 holding a stack of one or more baskets 46. The robot 30 may pick the basket 46 from the source location 26 and move the basket 46 to the input belt 48 of the washing machine 44. A camera 36 may not be required to cover the input and/or output belts 48, 50, as those locations may be fixed, and their status as empty or loaded with a basket 46 may be communicated to the conveyance system 20 from the machine 44. The conveyance system 20 may also perform the step of unloading the washing machine 44 by picking up a basket 46 from the output belt 50 and placing that basket at a destination location 28, which may be the top of a stack of other baskets 46 upon a carriage 56. The precise location and orientation of the destination 28 may vary according to the exact location of the carriage and/or the height of the stack of baskets 46 and may be determined by the second vision system 38 using one or more cameras 36. The system 20 may provide adaptive trajectory planning to determine the best path to move the baskets 46.

As illustrated in FIG. 5, the system 20 may include a trajectory planning controller 42 for planning a best path 40 for the robot 30 to follow in moving an item 21, which may be a basket 46, between the source location 26 and the destination 28. One or more cameras 36 may provide a 3-dimensional view to detect the exact position of a basket 46. The system 20 may also detect the number and shape of individual parts 22 in the basket 46. The trajectory planning controller 42 may perform several functions in the system 20, which may include, for example, 2D inspection of a basket 46 and parts 22 therein; 3D perception and localization; perception and load & force measurement; production process sequencing, providing a production graphical user interface (GUI); calibration and configuration software; and Production process specific motion planning and control, including the control of the end effector 32, also called end-of-arm-tooling (EOAT). The robot 30 may be a standard type used in industry for automation tasks, and the end effector 32 may be configured to grasp the standard basket 46 of different weights.

The trajectory planning controller 42 may provide adaptive trajectory planning using the information provided by the vision systems (pick part and place part), as well as predetermined or fixed locations to calculate the best trajectory for the robot to follow in picking and placing the item 21. The robot 30 may be directly controlled by a robot controller 60 which may handle safety functions, movement control, and control of the end effector 32. The trajectory planning controller 42 may coordinate and communicate with a robot operating system (ROS) driver 62. The trajectory planning controller 42 may also be operatively connected to a machine controller 64, such as the controller of the washing machine 44. This connection to the machine controller 64 may allow the system 20 to know when items may be loaded onto or removed from the machine 44. The operative connections between devices may include electrical, radio, optical, light-based, and/or mechanical interconnections and may be wired or wireless.

The robot 30 may be equipped with touch sensors 65, which may include pressurized air pads on the end effector 32 or gripper, which may allow the robot 30 to be used without the need for fencing. A touch sensor controller 66, such as an air skin controller, may be used to monitor the status of one or more touch sensors 65 on the robot 30, and may be operatively connected to a safety circuit of the robot controller 60. In order to allow the robot 30 to operate without traditional safety fencing, such a touch sensor configuration may require safety performance level E and may require the robot 30 to be able to react to all humans on the shop floor including operators, visitors, supplier staff, etc.. The touch sensor controller 66 may also be operatively connected to the adaptive system controller 42.

After processing by the washing machine 44, a camera 36 may identify a destination location 28 being a desired stack of baskets 46 upon a carriage 56 and which may vary in height as additional baskets 46 are added to the stack.

The conveyance system 20 of the present disclosure may provide the following functions: transporting a basket 46 accounting for variations in the precise special arrangement (x, y, z, roll, pitch, yaw) of both the pick and the place operations; identifying the general source and destination location 26, 28 (x, y, z, yaw) from a stack of one or more baskets 46 at each location 26, 28; type identification of baskets 46 (height, weight, insert feature & geometry); identifying interactions between baskets 46 (tangled or various other interactions matching predetermined criteria, such as being caught upon another item 21 and which may be known as easy to take apart); recognizing and reporting a damaged basket 46.

The conveyance system 20 may also provide for identification and information sharing regarding the items 21 being moved, such as, for example by reading a bar code on the baskets 46, and may also identify individual parts 22 within a basket 46, such as by their shape and size in 3-D space, and/or by their positioning within an insert in the basket 46. It may provide a mode in which the robot 30 drains fluid from the carriage 56, such as, for example, by moving the carriage 56 to a designated dumping location and opening a drain valve or by tilting the carriage 56.

The conveyance system 20 may automatically calibrate to account to changes in the environment, such as temperature and/or lighting, and may provide for environmental awareness, such as for crash detection and awareness. In other words, the cameras 36 of the conveyance system 20 may detect persons or other hazards, and may direct the robot 30 to avoid any such hazards. The conveyance system 20 may provide for increased system reliability and may allow for different sequencing or sorting baskets 46, such as, for example, in normal or special operation modes.

The present disclosure also provides a method for automatically moving one or more items 21 between a structure at a source location 26 and a destination 28 using a robot 30 with an end effector 32. The items 21 may be individual parts 22 or assemblies of parts 22 or other things such as a basket 46 for holding several parts 22. The structure may be a bin 24 for holding parts 22. The structure may also be, for example, a cart or a stack or a conveyor for holding or moving parts 22 or baskets 46. The method includes the steps of identifying a part 22 having a non-fixed location and orientation upon the structure at the source location 26 using a first vision system 34; determining the precise pick location and pick orientation of the part 22 upon the structure using the first vision system 34; and determining the location and orientation of a destination 28 using a second vision system 38. The first and second vision systems 34, 38 may be a combined vision system and may use one or more of the same cameras 36. The method also includes the step of performing adaptive trajectory planning to determine the best path 40 between the source location 26 and the destination 28. According to an aspect, the step of performing adaptive trajectory planning may include the sub-steps of planning a plurality of possible paths 40 between the source location 26 and the destination incorporating geometrical information of the robot and source location 26 and the pick orientation and the destination 28 which may include the target location and the target orientation; and determining a best path 40 between the source location 26 and the destination 28 by simulating the plurality of possible paths 40 between the source location 26 and the destination 28. One example of such an active trajectory planning is ROS (Robotic Operating System).

The method proceeds with the steps of picking the item 21 from the source location 26 by the end effector 32 on the robot 30; moving the item 21 along the best path 40 by the robot 30; placing the item 21 at the destination 28 by the end effector 32 on the robot 30. The method may also include the step of checking the item 21 for quality and/or other characteristics by one or more of the first vision system 34 and the second vision system 38.

According to an aspect, the destination 28 may have a fixed position and orientation. According to another aspect, the destination 28 may have a varying position, and/or orientation or one which is not fixed in space. According to another aspect, the item 21 may be disposed loosely or in a fixed position within a bin 24 at the source location 26.

According to an aspect, the first vision 34 system may be a 2D vision system and the method may further comprise the step of comparing by the first vision system 34 an image of the item 21 to a reference image to determine the source location 26 and the orientation of the item 21 at the source location 26, also called the pick orientation. According to another aspect, the first vision system 34 may be a 3D vision system, which may be capable of directly determining the source location 26 and pick orientation. According to an aspect, the system 20 may be used for two or more distinct pick-and-place operations such as, for example loading and unloading a machine 44 as shown in FIG. 4.

According to an aspect, the second vision system 38 may be a 2D vision system and the method may further comprise the step of comparing by the second vision system 38 an image of the item 21 to a reference image to determine the location and orientation of the destination 28. According to another aspect, the second vision system 38 may be a 3D vision system, which may directly determine the location orientation of the destination 28.

Figure 6:
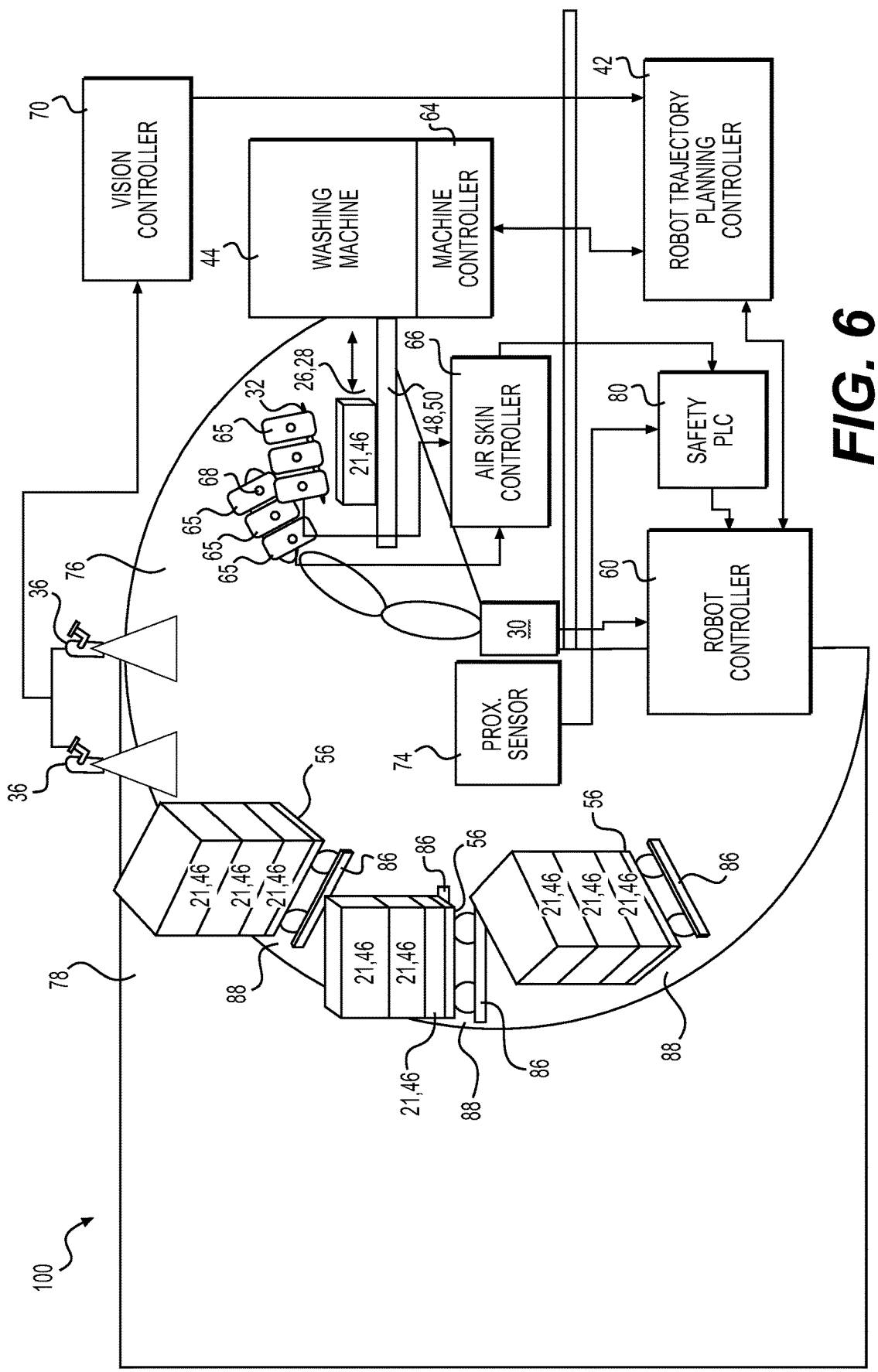
FIG. 6 is a schematic diagram of a fenceless robot system according to some embodiments of the present disclosure.

FIG. 6 shows a fenceless robot system 100 in accordance with some embodiments, and in which the robot 30 is configured to move in proximity to a person without a safety fence preventing the person from contacting the robot 30. The fenceless robot system 100 may be similar to the conveyance system 20 shown in FIGS. 1-5 and may include many of the same components. The example fenceless robot system 100 shown in FIG. 6 includes a vision controller 70 receiving signals from one or more cameras 36 for sensing a position and orientation of an item 21, such as a basket 46 in a stack upon a carriage 56 or a precise location of a carriage 56 as a destination for the robot 30 to place the basket 46. The input belt 48 may be a predetermined destination 28 for the robot to place baskets 46 to be processed by the washing machine 44. The output belt 50 may be a predetermined source location 26 for the robot 30 to pick and remove baskets 46 after processing by the washing machine 44. In some embodiments, and as shown in FIG. 6, the input belt 48 and the output belt 50 of the washing machine 44 may be integrated at a single, combined location. In some embodiments, one or more of the stacks of baskets 46 may function as a source location 26 for the robot 30 to pick baskets 46 of dirty parts to be loaded into the washing machine 44, and one or more other stacks of baskets 46 may be a destination 26 for the robot 30 to place baskets 46 of clean parts coming out of the washing machine 44. In some embodiments, the stack may include up to ten (10) baskets 46. It should be appreciated that the washing machine 44 is merely an example application and that the fenceless robot system 100 may be used for many other different applications.

The fenceless robot system 100 includes a trajectory planning controller 42, configured to plan a path for the robot 30 to follow in moving an item 21, such as a basket 46, between the source location 26 and the destination 28. The trajectory planning controller 42 may include a ROS (Robotic Operating System). Alternatively or additionally, the trajectory planning controller 42 may include another proprietary or open hardware and/or software system configured to plan the path or paths for the robot 30 to follow.

A proximity sensor 74 is configured to detect a person in proximity to the robot 30. The proximity sensor 74 may include, for example, a laser scanner, a LIDAR sensor, or one or more optical cameras, which may be combined with a machine vision processor configured to detect presence and/or location of a person. In some embodiments, and as shown in FIG. 6, the proximity sensor 74 may be configured to sense a person within an inner zone 80 containing the robot 30 or an outer zone 82 outside of the reach of the robot 30. In some embodiments, such as the arrangement shown in FIG. 6, the proximity sensor 74 may be located adjacent to the robot 30. In other embodiments, the proximity sensor 74 may be spaced away from the robot 30.

As also shown in FIG. 6, one or more touch sensors 65 are disposed on surfaces of the robot 30 and on surfaces surrounding the end effector 32. The touch sensors 65 are configured to detect a contact between an external object, such as a person, and the surface of the robot 30 or the surface surrounding the end effector 32. A touch sensor controller 66 is configured to monitor the touch sensors 65 and to report the detection of a contact with an external object. In some embodiments, one or more of the touch sensors 65 include a bladder configured to deform and to generate a change in fluid pressure in response to contacting the external object. For example, each of a plurality of bladders (not shown) may cover a region of the surface of the robot 30 or the surface surrounding the end effector 32. Alternatively or additionally, one or more of the touch sensors 65 may include a rigid or semi-rigid panel configured to be displaced by contact with an external object, and the displacement of the panel may be cause a corresponding bladder to be squeezed, generating a corresponding increase in fluid pressure, which may be sensed. The touch sensors 65 may be, for example, Airskin product from Blue Danube Robotics.

In some embodiments, a visual indicator 68, such as a multi-colored light, is configured to indicate a contact between the external object and the surface of the robot 30 or the surface surrounding the end effector 32. The visual indicator 68 may be disposed within or projected upon a region of the surface of the robot 30 or the surface surrounding the end effector contacted by the external object. In some embodiments, each of the touch sensors 65 may include a corresponding visual indicator 68 which may change between different appearances to indicate various status conditions regarding the touch sensor 65. For example, a solid blue light may indicate that the touch sensor 65 is in working condition and is actively waiting to detect a contact with an external object; a flashing red light may indicate that the touch sensor 65 is currently detecting contact with an external object; and a solid red light may indicate that the touch sensor 65 previously detected contact with an external object and is holding its state until it receives a reset signal.

A safety Programmable Logic Controller (safety PLC) 80 is configured to monitor the touch sensor and the proximity sensor and to stop the robot 30 in response to an error condition by the touch sensor 65, the touch sensor controller 66, and/or the proximity sensor 74. The error condition may include sensing a person within one of the predefined zones 76, 78, detecting a contact between the robot 30 or the end effector 32 and an external object, or an internal or external failure of any hardware or software of the touch sensor 65, the touch sensor controller 66, and/or the proximity sensor 74. The safety PLC 80 may include integrated safety functions, safety-certified hardware and software, redundant and/or self-checking circuits to verify proper operation of the touch sensor 65, the touch sensor controller 66, and/or the proximity sensor 74. The safety PLC 80 may include, for example, a safety-rated PLC by Siemens or Allen-Bradley.

In some embodiments, and as also shown in FIG. 6, the fenceless robot system 100 includes a processing status indicator 86 adjacent to a processing location 88, such as a combined source location 26 and destination 28. The processing status indicators 86 are configured to indicate a condition of one or more items 21 located at the processing location 88. For example, the processing status indicators 86 may indicate one of a plurality of different condition states of the one or more items 21 located at the processing location 88. In some embodiments, the processing status indicators 86 each comprise a lighted indicator having one of a plurality of different colors or patterns, with each of the different colors or patterns indicating a corresponding one of the different condition states.

For example, the processing status indicator 86 may be illuminated red to indicate the processing location 88 being in an active state corresponding to the robot 30 actively using the processing location 88 as a source location 26 or as a destination 28. The processing status indicator 86 may be illuminated purple to indicate the processing location 88 being in a ready state corresponding to items 21 at the processing location 88 being in a queue to be used by the robot 30 in the future. The processing status indicator 86 may be illuminated blue to indicate the processing location 88 being in an inactive state corresponding to items 21 at the processing location 88 that are not yet processed for use by the robot 30. The processing status indicator 86 may be illuminated green to indicate the processing location 88 being in a completed state corresponding to the processing location 88 holding items that have finished being processed by the robot 30 and which are ready to be taken away from the fenceless robot system 100. The colors and states of the processing status indicators 86 are merely examples, and other colors and/or state condition may be used or indicated by the status indicators 86.

One or more of the processing locations 88 may be dedicated source locations 26 where items 21 are picked and removed by the robot 30. Alternatively or additionally, one or more of the processing locations 88 may be dedicated destinations 28 where items 21 are placed by the robot 30. In the example shown in FIG. 6, several different processing locations 88 are provided as regions or fixtures for placement of a carriage 56 holding a stack of one or more baskets 46.

Figure 7:
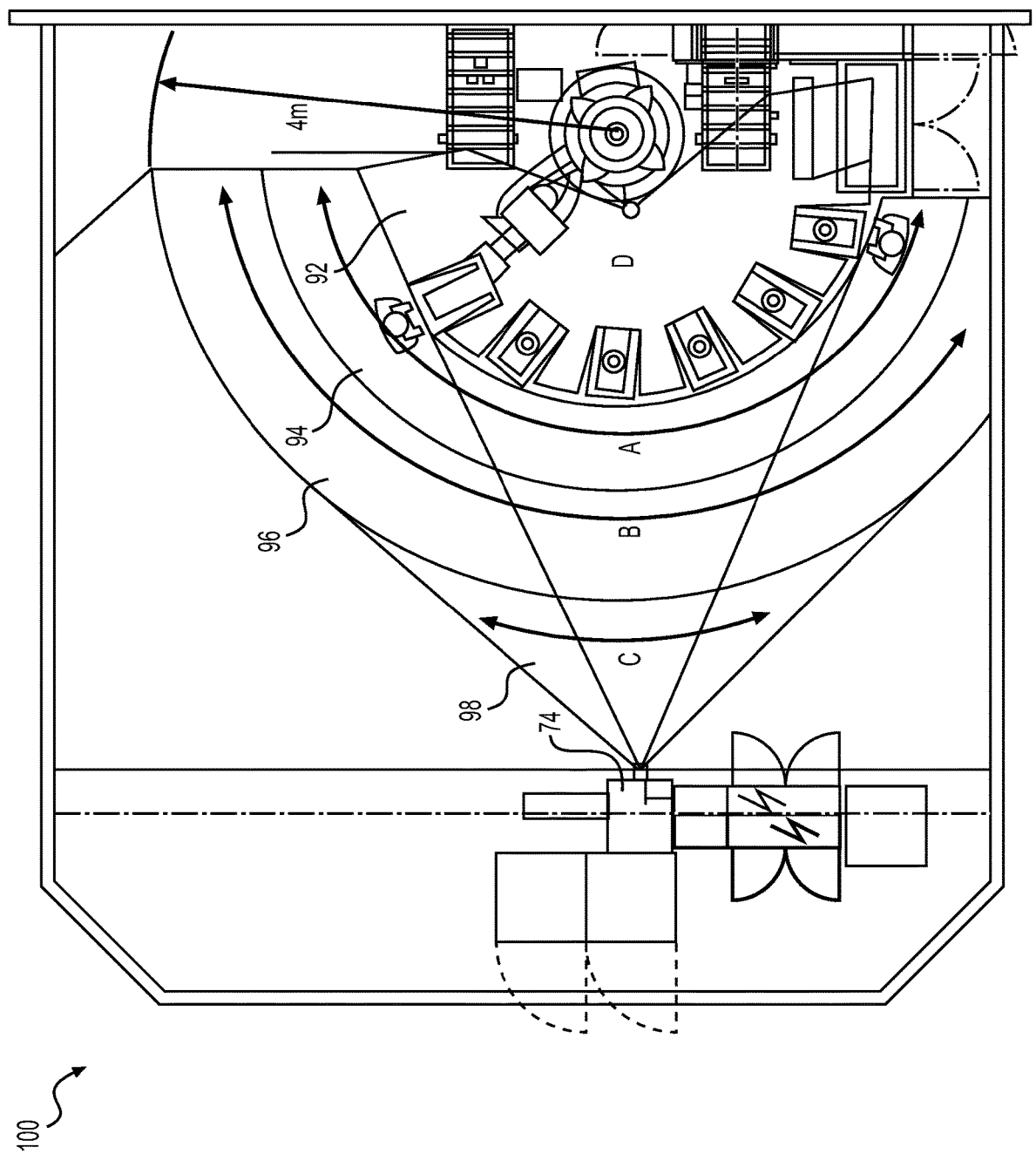
FIG. 7 is a plan view diagram of the fenceless robot system according to some embodiments of the present disclosure.
Figure 8:
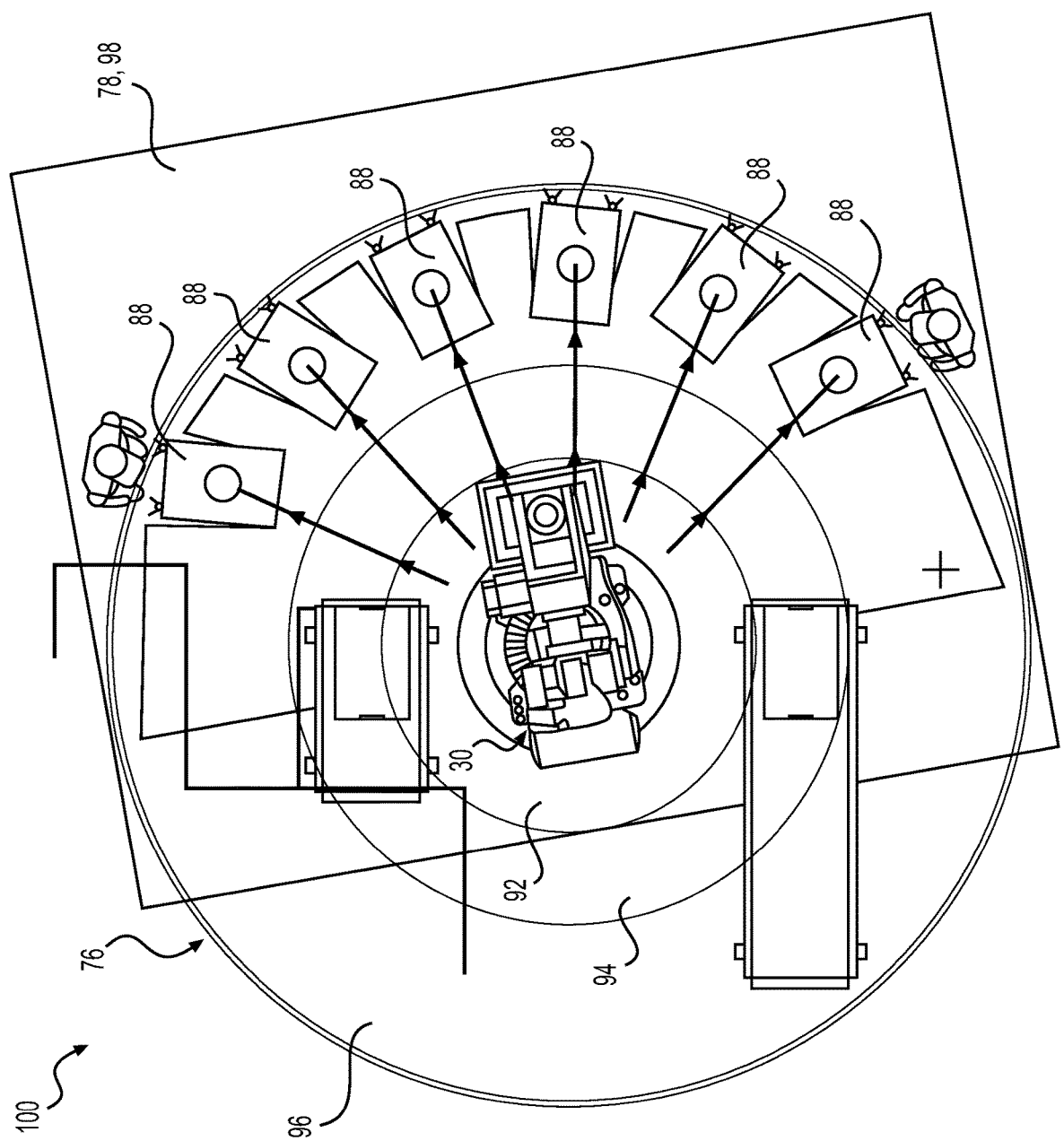
FIG. 8 is another plan view diagram of the fenceless robot system according to some embodiments of the present disclosure.

FIGS. 6-7 show a schematic diagrams of the fenceless robot system 100 according to some embodiments of the present disclosure. Specifically, FIGS. 6-7 show a plurality of zones 92, 94, 96, 98 concentrically surrounding the robot 30. The plurality of zones 92, 94, 96, 98 includes a restricted access zone 92 which may be designated for exclusive operation of the robot 30. In some embodiments, and as shown in FIG. 7, the restricted access zone 92 may extend around the robot 30 and have a radius of 733 mm. The plurality of zones 92, 94, 96, 98 also includes an inner safety zone 94 surrounding the restricted access zone 92 and extending between 733-1466 mm from the center of the robot 30. The plurality of zones 92, 94, 96, 98 also includes an outer safety zone 96 surrounding the inner safety zone 94 and extending between 1466-2200 mm from the center of the robot 30. The plurality of zones 92, 94, 96, 98 also includes a limited access zone 98 outside of the outer safety zone 96 having limited access or use restrictions. For example, the limited access zone 98 may be designated as a "no-storage zone" where storage of carriages 56 or other items is prohibited in order to ensure a clear line of sight between the proximity sensor 74 and the other ones of the plurality of zones 92, 94, 96, 98.

In some embodiments, and as shown in FIG. 7, the inner zone 76 is subdivided into the restricted access zone 92 and the inner and outer safety zones 94, 96, and the peripheral zone 78 defines the limited access zone 98. In some embodiments, and as shown in FIG. 7, the robot 30 is configured to limit the speed of the end effector 32 in one or more of the plurality of zones 92, 94, 96, 98 in response to detecting a human within or in proximity to the inner zone 76. For example, the robot 30 may be configured to move the end effector 32 at a speed of up to 500 mm/s within the restricted access zone 92 if no humans are present, and the robot 30 may limit the speed of the end effector 32 within the restricted access zone 92 to 350 mm/s in response to detecting a human within or in proximity to the inner zone 76. The robot 30 may be configured to move the end effector 32 at a speed of up to 350 mm/s within the inner safety zone 94 regardless of whether a human is present within or in proximity to the inner zone 76. The robot 30 may be configured to move the end effector 32 at a speed of up to 250 mm/s within the outer safety zone 96 if no humans are present, and the robot 30 may limit the speed of the end effector 32 within the outer safety zone 96 to 50 mm/s in response to detecting a human within or in proximity to the inner zone 76.

In some embodiments, the end effector 32 may not be limited to the lower limited speed for some motions which have a lower risk of presenting a hazard to a human in proximity to the robot 30, such as motions toward the center of the robot 30.

Figure 10:
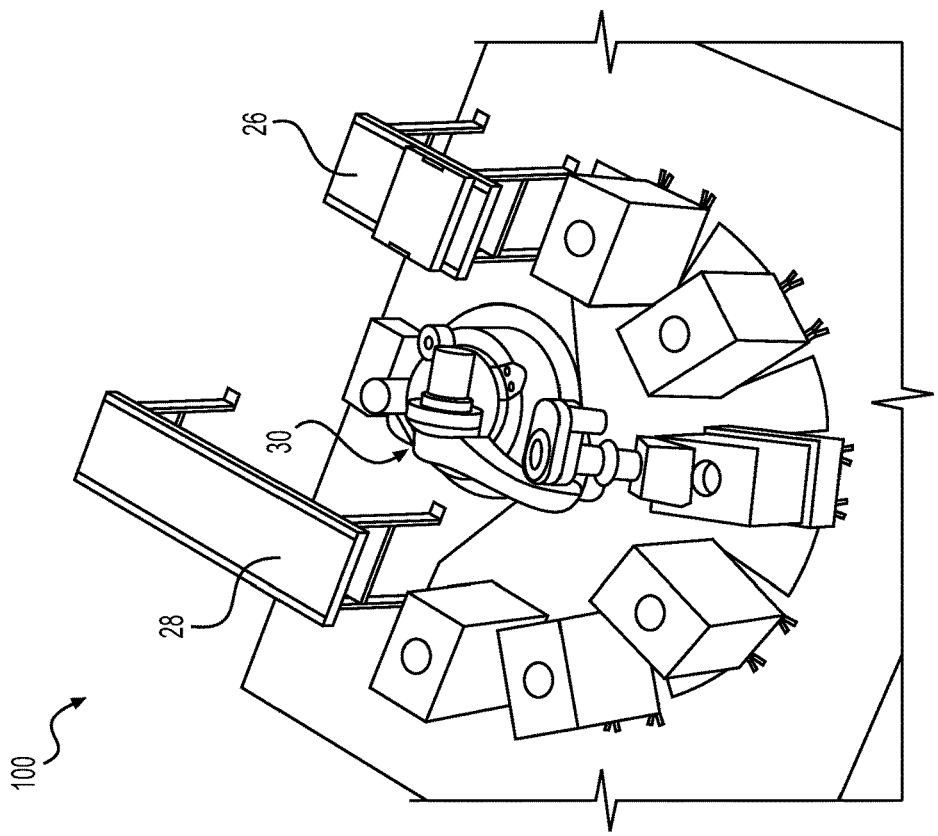
FIGS. 9-10 show perspective views of the fenceless robot system according to some embodiments of the present disclosure.
Figure 9:
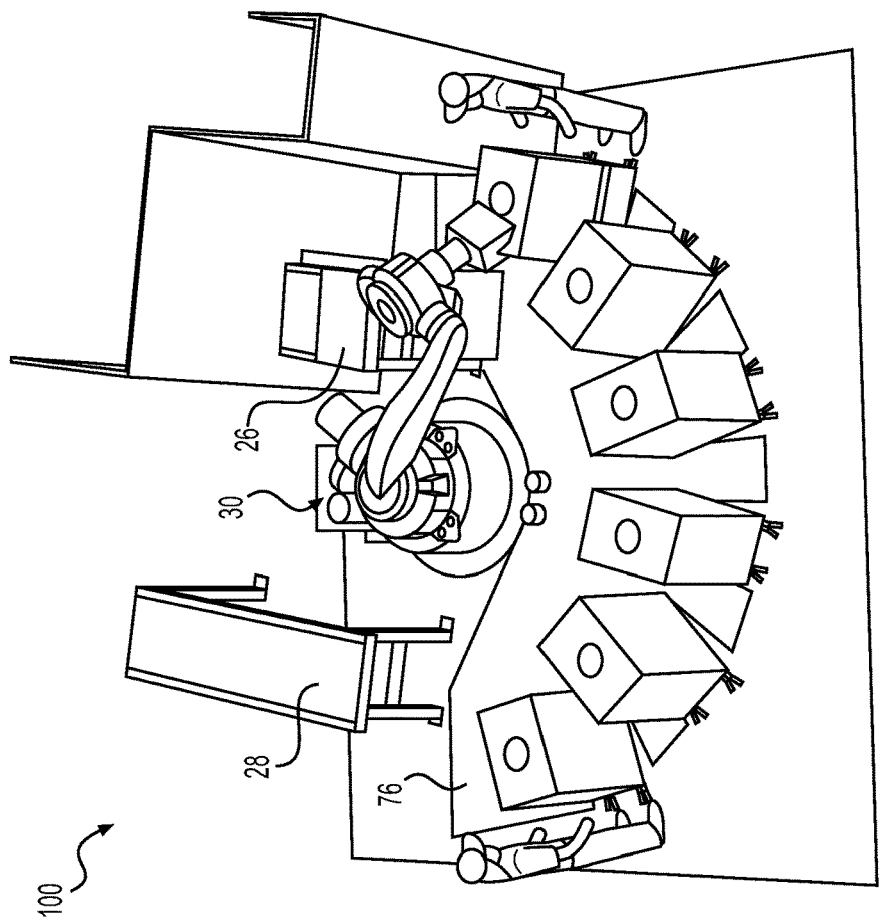
Figure 11:
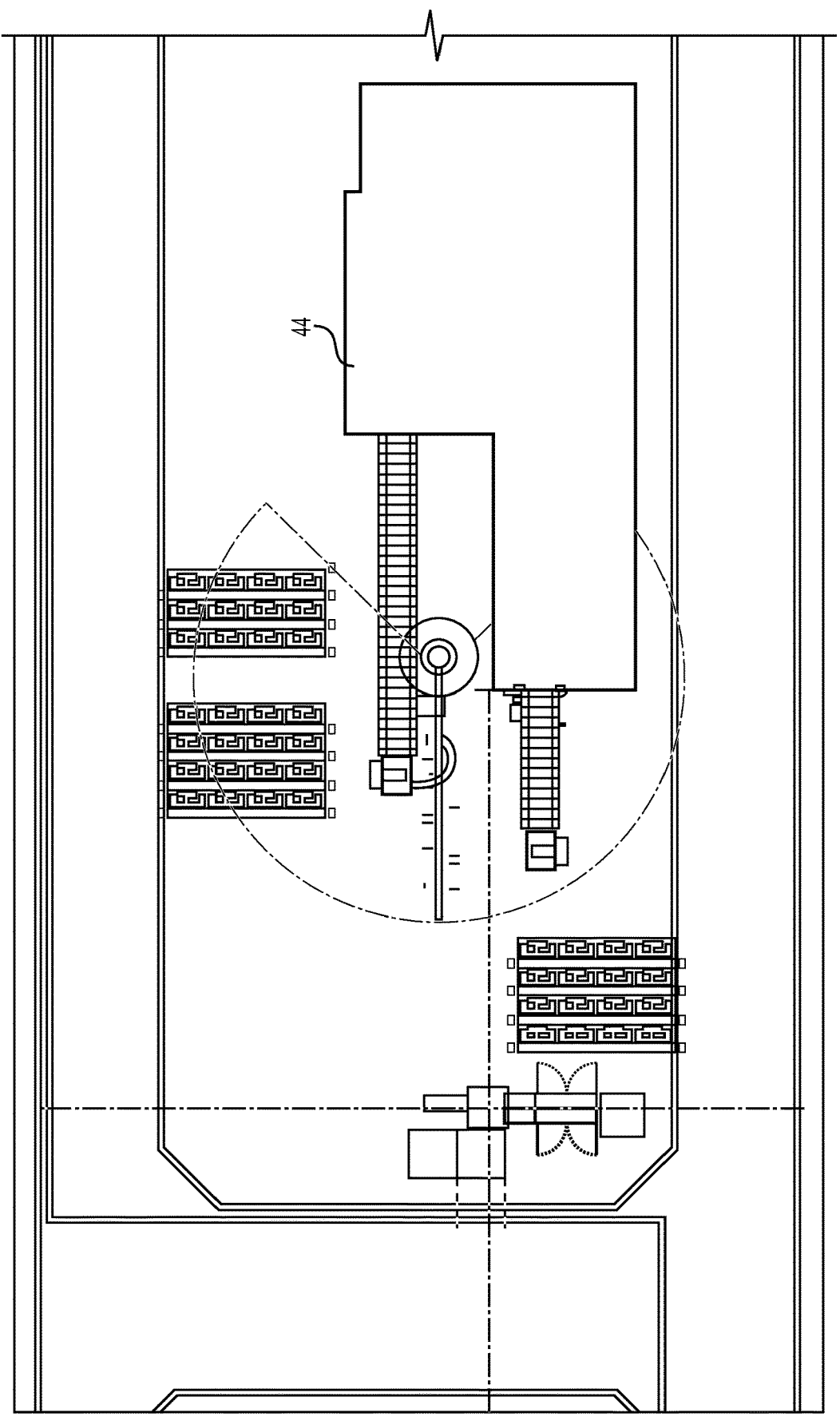
FIG. 11 shows a plan view diagram of a washing machine configured for manual loading and unloading operation.
Figure 12:
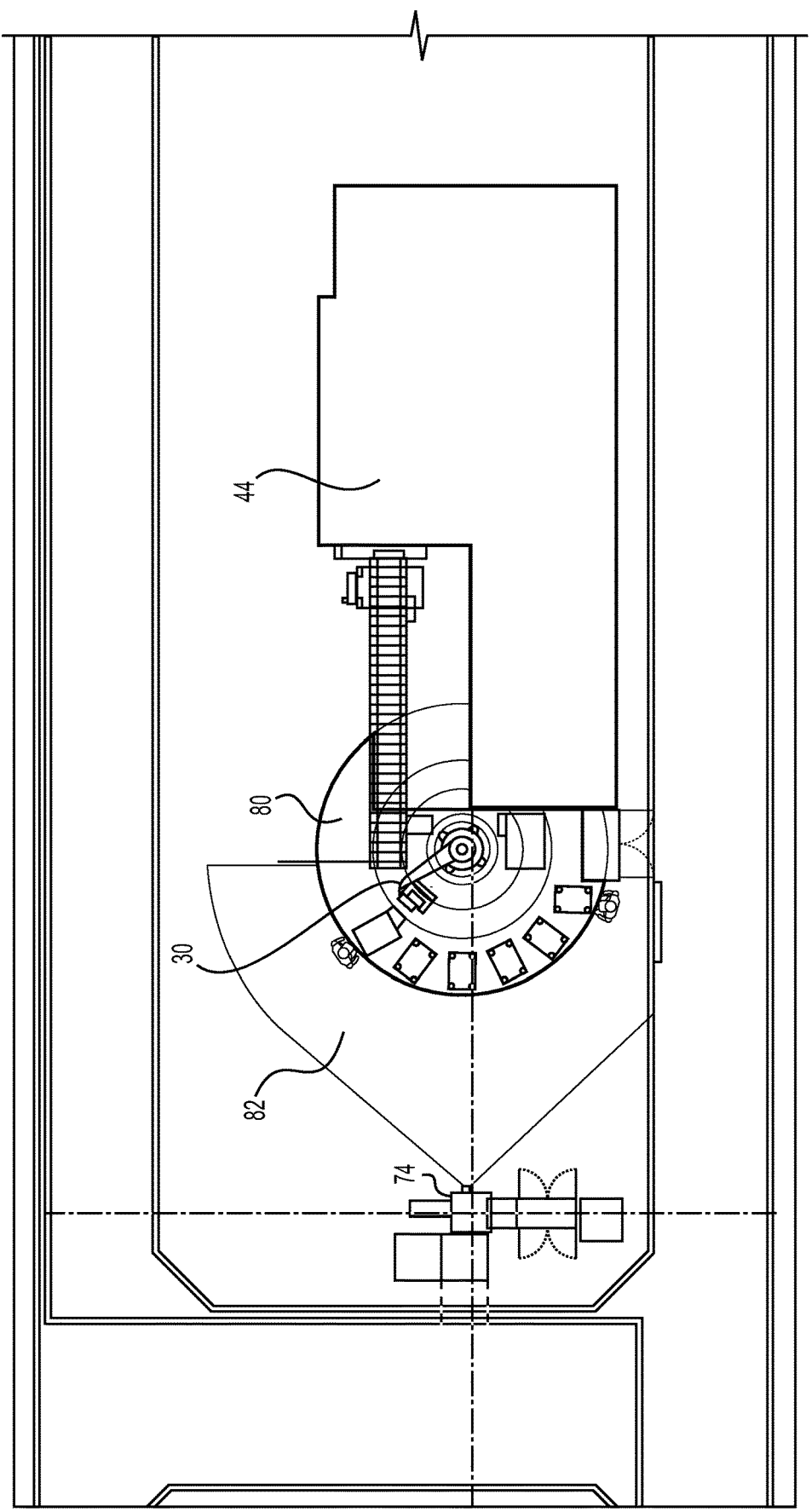
FIG. 12 shows a plan view diagram of a washing machine configured for automated loading and unloading using the fenceless robot system of the present disclosure.
Figure 13:
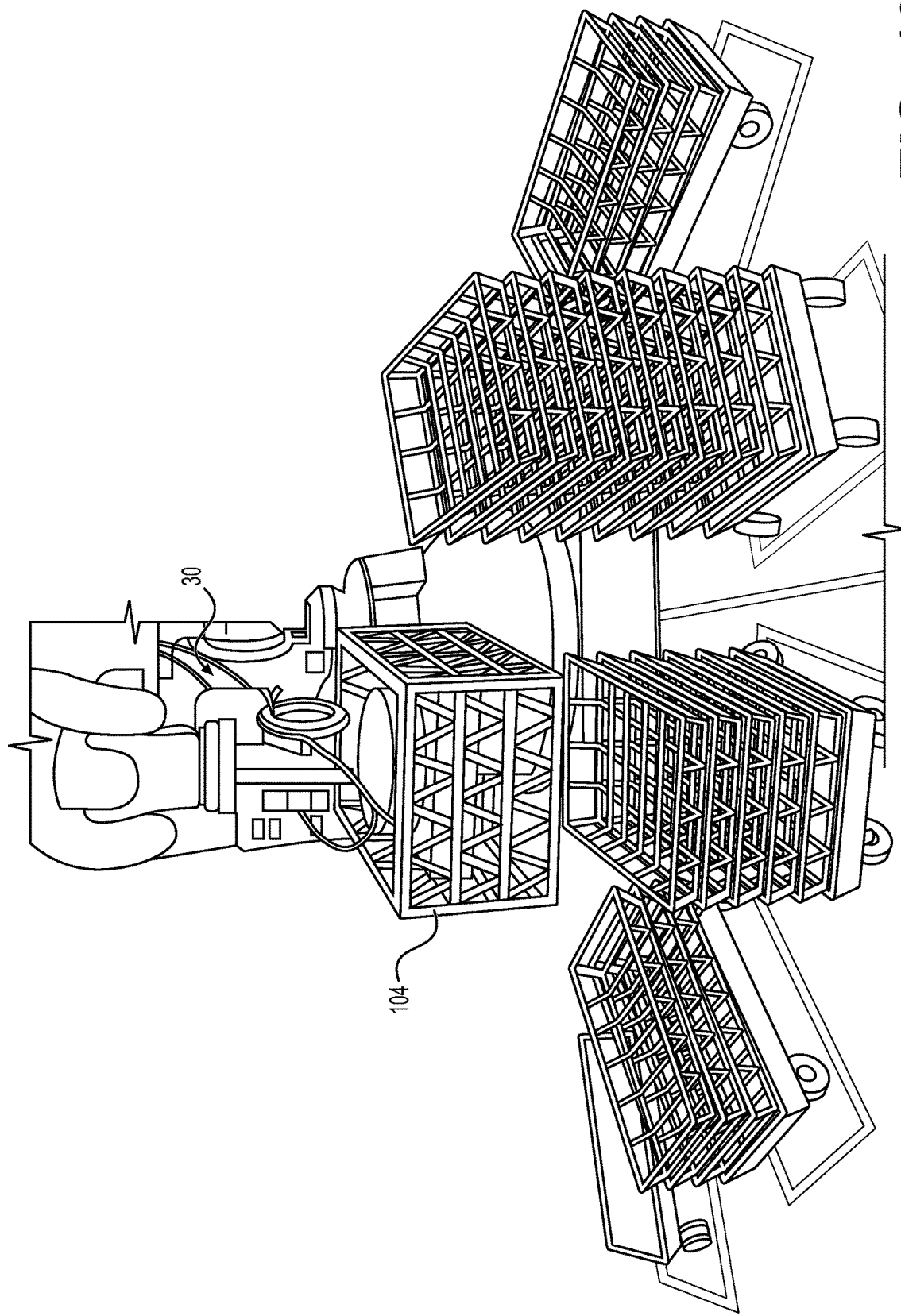
FIG. 13 shows an image of components of the fenceless robot system according to some embodiments of the present disclosure.
Figure 14:
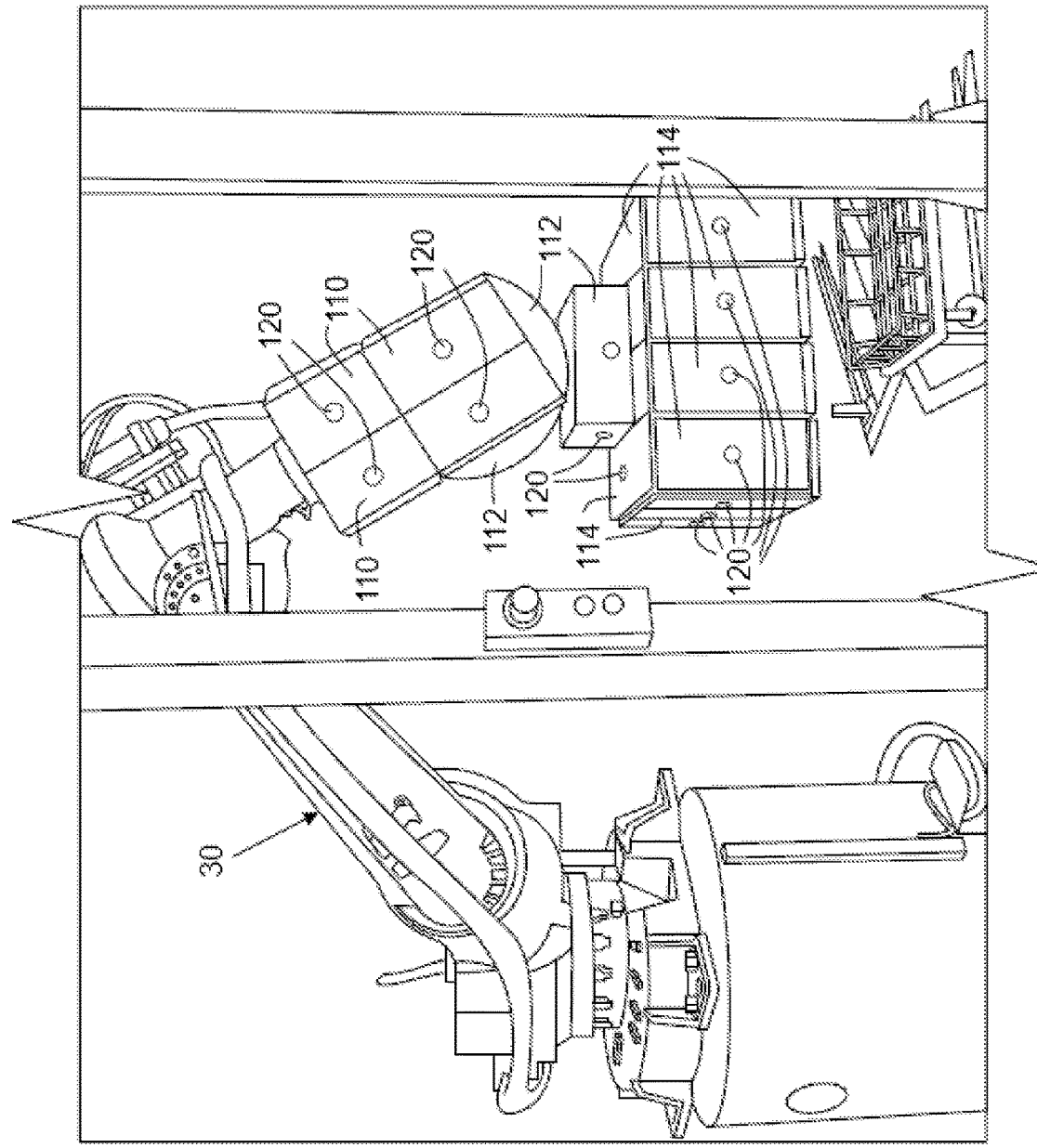
FIG. 14 shows an image of components within the fenceless robot system according to some embodiments of the present disclosure.
Figure 15:
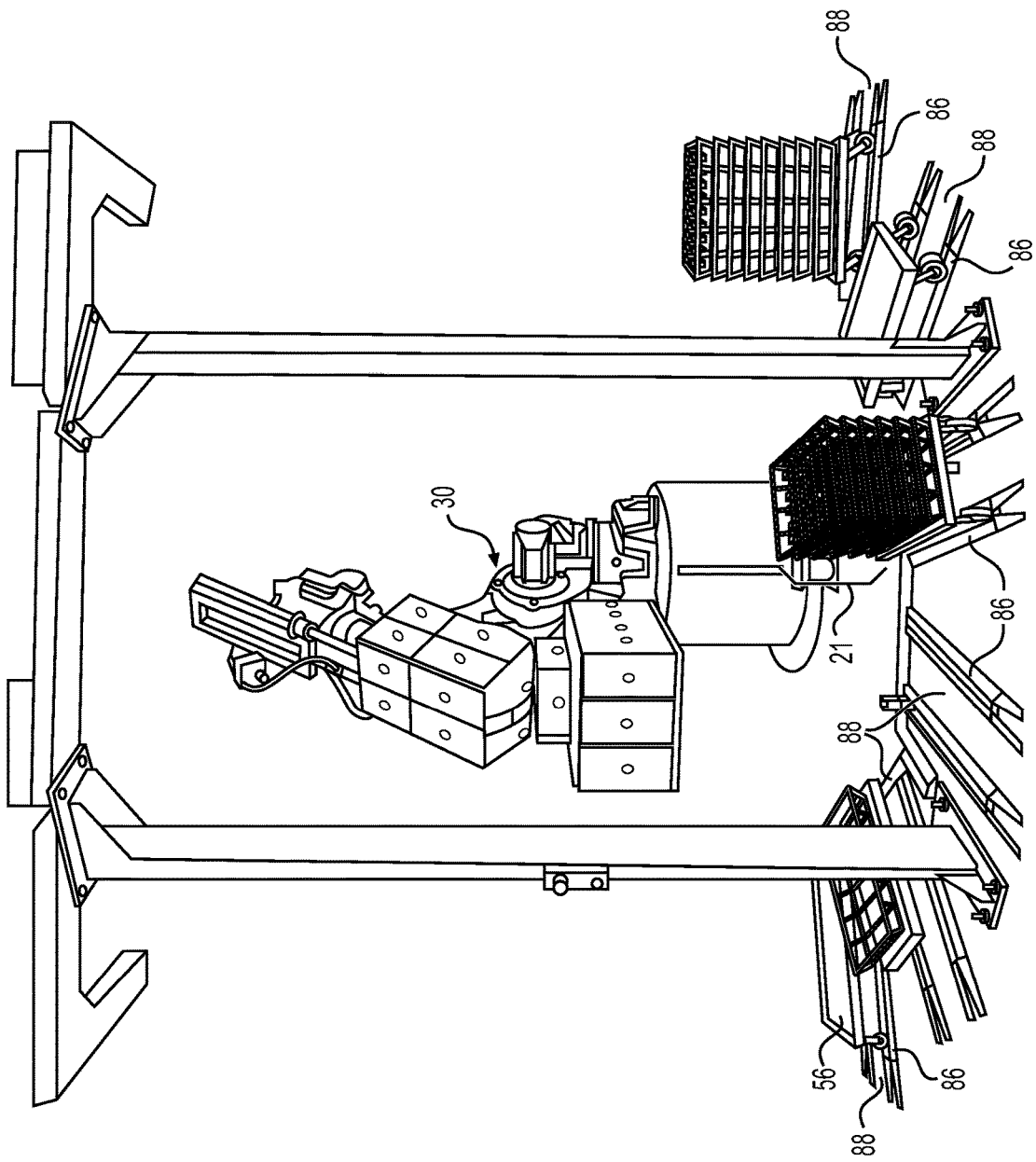
FIG. 15 shows an image of the fenceless robot system according to some embodiments of the present disclosure.

FIGS. 9-10 show perspective views of the fenceless robot system 100 according to some embodiments of the present disclosure. FIG. 11 shows a plan view of a washing machine 44 configured for manual loading and loading operation. FIG. 12 shows a plan view of the same washing machine 44 of FIG. 11 configured to be loaded and unloaded by the fenceless robot system 100. FIGS. 13-15 show images of components of the fenceless robot system 100 according to some embodiments of the present disclosure. FIG. 13 shows a frame structure 104 that surrounds the end effector (not shown) and which is used for mounting the touch sensors 65 surrounding the end effector.

In some embodiments, and as shown in FIG. 11, a plurality of first panels 110 are disposed upon a part of the robot 30, such as an arm. Each of the first panels 110 may be configured to detect a contact with an external object, such as a person, with a surface of the robot. In some embodiments, and as also shown in FIG. 11, a plurality of second panels 112 are disposed upon or around a joint between the robot 30 and an end effector thereof. Each of the second panels 112 may be configured to detect a contact with an external object, such as a person, with a surface of the joint. In some embodiments, and as also shown in FIG. 11, a plurality of third panels 114 are disposed around an end effector of the robot 30. The third panels 114 may define a box shape with an open bottom for receiving the objects to be moved by the robot 30. Each of the first panels 110 may be configured to detect a contact with an external object, such as a person, with a surface of the end effector. The system may include a visual indicator 120 showing a location of the contact between the external object and the surface of the robot 30 or the surface surrounding the end effector corresponding indicator. For example, the visual indicator 120 may take the form of a warning light on each of the panels 110, 112, 114 that illuminates in response to the corresponding one of the panels 110, 112, 114 detecting a contact. The visual indicator 120 may take other forms, such as a light or other indicator that is projected upon the surface at or near the location of a detected contact with an external object.

A method for moving an item 21 using a fenceless robot system 100 is also provided. The method comprises: picking an item from a source location 26 by an end effector 32 on a robot 30; moving the item along a path to a destination 28 by the robot 30; placing the item at the destination 28 by the end effector on the robot 30; and stopping the robot 30 from moving in response to detecting contact between an external object and a surface of the robot 30 or a surface surrounding the end effector 32. The robot 30 is configured to move in proximity to a person without a safety fence preventing the person from contacting the robot 30.

In some embodiments, the method for moving an item 21 using a fenceless robot system 100 also includes indicating the contact between the external object and the surface of the robot 30 or the surface surrounding the end effector 32 by a visual indicator 68 in a region of the surface of the robot 30 or the surface surrounding the end effector 32 contacted by the external object.

In some embodiments, the robot 30 is capable of moving a payload, including the end effector 30 and the item 21, having a mass of at least 100 kg. In some example embodiments, the robot 30 may be capable of moving an item 21, such as a basket 46 full of parts having a combined mass of about 40 kg, however, the robot 30 may be configure to move items 21 having greater mass. In some embodiments, the robot 30 moves the item 21 at a speed greater than 200 mm/s. In some embodiments, the robot 30 moves the item 21 at a speed of up to 500 mm/s. In some embodiments, the robot 30 moves the item 21 at a speed of up to 700 mm/s.

In some embodiments, the method for moving an item 21 using a fenceless robot system 100 also includes detecting the person in one of a plurality of zones around the robot; and adjusting a speed of the robot 30 in response to detecting the person in one of the plurality of zones around the robot. In some embodiments, adjusting a speed of the robot 30 in response to detecting the person in one of the plurality of zones around the robot further comprises limiting the speed of the robot to a predetermined threshold speed; and the predetermined threshold speed is one of a plurality of different speeds depending on a location of the end effector 32 of the robot 30.

In some embodiments, the method for moving an item 21 using a fenceless robot system 100 also includes detecting the person in one of a plurality of zones 92, 94, 96, 98 around the robot 30 being a restricted access zone 92; and immediately stopping the robot 30 from moving in response to detecting the person in the restricted access zone 92.

In some embodiments, the method for moving an item 21 using a fenceless robot system 100 also includes detecting the person in one of a plurality of zones around the robot being an outer safety zone; and limiting a speed of the robot 30 in response to detecting the person in outer safety zone. In some embodiments, limiting the speed of the robot 30 in response to detecting the person in outer safety zone may comprise limiting the speed of the robot 30 in motions toward or across the outer safety zone while not limiting the speed of the robot 30 in motions away from the outer safety zone.

In some embodiments, the method for moving an item 21 using a fenceless robot system 100 also includes detecting the person in one of a plurality of zones around the robot being an inner safety zone located between the robot and the outer safety zone; and immediately stopping the robot from moving in response to detecting the person in the inner safety zone if the robot is moving toward or across the outer safety zone at a speed in excess of a predetermined threshold.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for moving an item, the method comprising:
picking an item from a source location by an end effector on a robot;
moving the item along a path to a destination by the robot;
placing the item at the destination by the end effector on the robot;
stopping the robot from moving in response to detecting contact between an external object and one of: a surface of the robot, or a surface surrounding the end effector;
indicating the contact between the external object and the one of the surface of the robot or the surface surrounding the end effector by a visual indicator in a region of the surface of the robot or the surface surrounding the end effector contacted by the external object; and
wherein the robot is configured to move in proximity to a person without a safety fence preventing the person from contacting the robot, and wherein the method further comprises:
    detecting the person in one of a plurality of zones around the robot; and
    adjusting a speed of the robot in response to detecting the person in one of the plurality of zones around the robot,
    wherein adjusting the speed of the robot in response to detecting the person in one of the plurality of zones around the robot further comprises limiting the speed of the robot to a predetermined threshold speed, and
    wherein the predetermined threshold speed is one of a plurality of different speeds depending on a location of the end effector of the robot.

2. The method of claim 1, wherein the one of the plurality of zones around the robot is a restricted access zone; and
    the method further comprising: immediately stopping the robot from moving in response to detecting the person in the restricted access zone.

3. The method of claim 1, wherein the one of the plurality of zones around the robot is an outer safety zone; and
    the method further comprising: limiting a speed of the robot in response to detecting the person in outer safety zone.

4. The method of claim 3, wherein limiting the speed of the robot in response to detecting the person in the outer safety zone comprises limiting the speed of the robot in motions toward or across the outer safety zone while not limiting the speed of the robot in motions away from the outer safety zone.

5. The method of claim 3, wherein the one of the plurality of zones around the robot is an inner safety zone located between the robot and the outer safety zone; and
    the method further comprising: immediately stopping the robot from moving in response to detecting the person in the inner safety zone if the robot is moving toward or across the outer safety zone at a speed in excess of a predetermined threshold.

6. A fenceless conveyance system comprising:
    a robot having an end effector configured to selectively grasp an item and to perform the method of claim 1;
    a trajectory planning controller configured to direct the robot to move the item between a source location and a destination;
    a touch sensor configured to detect a contact between an external object and a surface of the robot or a surface surrounding the end effector, wherein the touch sensor comprises a plurality of bladders configured to deform and to generate a change in fluid pressure in response to contacting the external object, with each of the plurality of bladders covering a region of the surface of the robot or the surface surrounding the end effector;
    a proximity sensor configured to detect a person in proximity to the robot; and
    wherein the robot is configured to move in proximity to a person without a safety fence preventing the person from contacting the robot.

7. The fenceless conveyance system of claim 6, wherein the proximity sensor comprises one of a laser scanner, one or more cameras, or a LIDAR sensor.

8. The fenceless conveyance system of claim 6, further comprising a safety Programmable Logic Controller (safety PLC) configured to monitor the touch sensor and the proximity sensor and to stop the robot in response to an error condition by either of the touch sensor or the proximity sensor.

9. The fenceless conveyance system of claim 6, further comprising a visual indicator showing a location of the contact between the external object and the surface of the robot or the surface surrounding the end effector.

10. The fenceless conveyance system of claim 9, wherein the visual indicator includes a multi-colored light configured to illuminate with a predetermined color to indicate the contact between the external object and the surface of the robot or the surface surrounding the end effector.

11. The fenceless conveyance system of claim 9, wherein the visual indicator is disposed within or adjacent to the surface of the robot or the surface surrounding the end effector.

12. The fenceless conveyance system of claim 9, wherein the visual indicator projected upon the surface of the robot or the surface surrounding the end effector.

13. The fenceless conveyance system of claim 6, further comprising: a processing status indicator adjacent to a processing location for indicating a condition of one or more items located at the processing location, the processing status indicator indicating one of a plurality of different condition states of the one or more items located at the processing location.

14. The fenceless conveyance system of claim 13, wherein the plurality of different condition states of the one or more items at the processing location comprise:
    an active state corresponding to the robot actively using the processing location as a source location or as a destination; and
    a ready state corresponding to items at the processing location being in a queue to be used by the robot in the future;
    an inactive state corresponding to items at the processing location that are not yet processed for use by the robot; and
    a completed state corresponding to the processing location holding items that have finished being processed by the robot.

15. The fenceless conveyance system of claim 6, wherein the touch sensor is configured to detect the contact between the external object and the surface surrounding the end effector.

16. The method of claim 1, wherein the one of the surface of the robot or the surface surrounding the end effector includes the surface surrounding the end effector.

17. The method of claim 16, wherein detecting the contact between the external object and the surface surrounding the end effector includes detecting a change in fluid pressure as a result of a deformation of a bladder covering the surface surrounding the end effector.

18. The method of claim 1, wherein the robot moves a payload, including the end effector and the item, having a mass of at least 100 kg.

* * * * *